Aug. 28, 1956 J. E. BRIDGES 2,761,010

VERTICAL SYNCHRONIZING PULSE SELECTOR

Filed Oct. 20, 1951 2 Sheets-Sheet 1

*INVENTOR:*
JACK E. BRIDGES
BY Francis W. Crotty
HIS ATTORNEY.

Aug. 28, 1956 J. E. BRIDGES 2,761,010

VERTICAL SYNCHRONIZING PULSE SELECTOR

Filed Oct. 20, 1951 2 Sheets-Sheet 2

INVENTOR:
JACK E. BRIDGES
BY Francis W. Crotty
HIS ATTORNEY.

2,761,010

VERTICAL SYNCHRONIZING PULSE SELECTOR

Jack E. Bridges, Chicago, Ill., assignor to Zenith Radio Corporation, a corporation of Illinois Application October 20, 1951, Serial No. 252,323

1 Claim. (Cl. 178—7.5)

This invention relates to synchronizing systems for television receivers and the like and more particularly to such systems providing improved noise immunity.

One of the major sources of difficulty in the reproduction of televised images has been the disrupting influence of extraneous noise on the scanning circuits of the receiver. In a simple receiver employing triggered synchronization, the scanning circuits are unable to distinguish between the desired synchronizing-pulse components of the composite video signals and the extraneous noise impulses which may be caused by atmospheric conditions, ignition noise and the like. Consequently, such receivers have a tendency toward false synchronization, or in some instances complete loss of synchronization. The disrupting influence of impulse noise on the line-frequency scanning system is quite commonly overcome by the use of automatic frequency control which has an integrating effect, rendering the line-frequency scanning system responsive to the average synchronizing information extending over a number of line-trace intervals; since the extraneous noise is generally distributed in a random fashion with respect to time, it has no substantial effect on the operation of the automatic frequency control system. However, automatic frequency control has not been commonly employed in connection with the field-frequency scanning circuits for a number of reasons. As a consequence, the field-frequency synchronization is appreciably more sensitive to extraneous noise than any other portion of the receiver, and composite video signals containing ample picture information are incapable of satisfactory reproduction in many areas on this account.

It is an important object of the present invention to provide a new and improved synchronizing system for a television receiver or the like characterized by materially improved noise immunity.

It is another object of the invention to provide a new and improved synchronizing system for a television receiver or the like which affords greatly improved noise immunity for the field-frequency scanning circuits.

These and other objects of the invention are accomplished in a television receiver for utilizing composite video signals including video-signal components and a composite synchronizing signal comprising line-synchronizing pulses and field-synchronizing pulses serrated at an integral multiple of the repetition frequency of the line-synchronizing pulses. The receiver comprises an image-reproducing device, means for separating the composite synchronizing signal from the video-signal components, and means coupled to the separating means and responsive to the line-synchronizing pulses for controlling the line-frequency scansion of the image-reproducing device. The receiver further comprises filter means substantially selective to the repetition frequency of the serrations of the field-synchronizing pulses. The separating means is coupled to the filter means for impressing the composite synchronizing signal thereon to produce an oscillatory voltage characterized by an abrupt change, including a substantial phase reversal and consequent decrease in amplitude, at the commencement of each field-synchronizing pulse. Means are coupled to the filter means for developing a control signal in response to the abrupt change in the oscillatory voltage developed by the filter means, and the control signal thus developed is employed to control the field-frequency scansion of the image-reproducing device.

The features of the present invention which are believed to be novel are set forth with particularity in the appended claim. The invention, together with further objects and advantages thereof, may best be understood, however, by reference to the following description taken in connection with the accompanying drawings, in the several figures of which like reference numerals indicate like elements, and in which:

Figure 1:
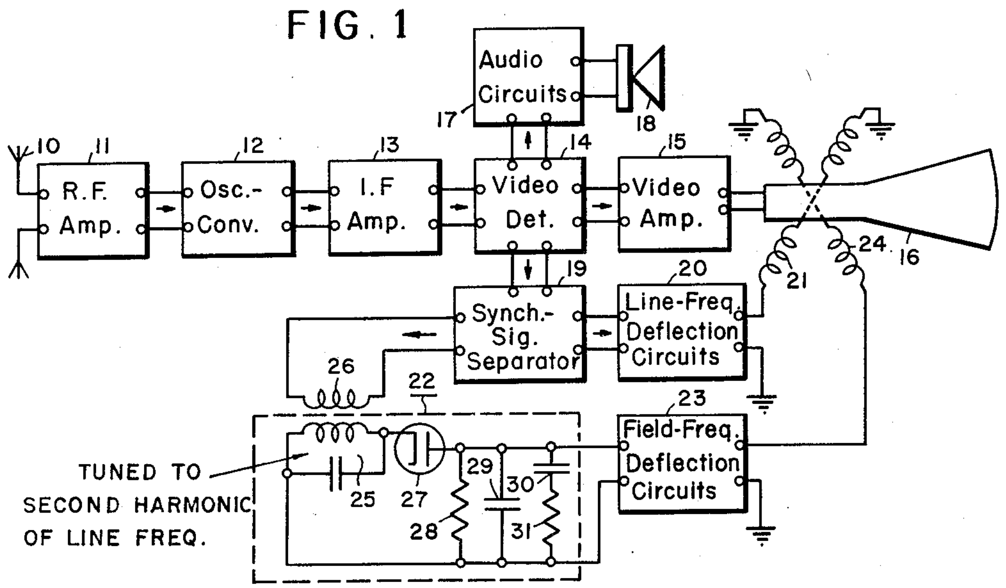
Figure 1 is a schematic diagram of a television receiver constructed in accordance with the present invention.

In the receiver of Figure 1, incoming composite television signals are intercepted by an antenna 10, amplified by a radio-frequency amplifier 11, and impressed upon an oscillator-converter 12. Intermediate-frequency composite television signals from oscillator-converter 12 are amplified by means of an intermediate-frequency amplifier 13 and detected in a video detector 14. Detected composite video signals are amplified by one or more stages 15 of video amplification and impressed on the input circuit of a cathode-ray tube 16 or other image-reproducing device. Intercarrier sound signals from video detector 14, or alternatively from video amplifier 15, are impressed on conventional audio circuits 17 including a frequency detector and one or more stages of audio amplification, the amplified audio signals being impressed on a loudspeaker 18 or other sound-reproducing device.

Composite video signals from video detector 14 are also applied to the input circuit of a synchronizing-signal separator 19. Line-frequency synchronizing-signal pulses from separator 19 are impressed on suitable deflection circuits 20 which supply line-frequency scanning signals to a line-frequency deflection coil 21 associated with image-reproducing device 16. The composite synchronizing signal from separator 19 is also impressed on a control stage 22 which develops a control signal indicative of the field-frequency synchronizing information. This control signal is applied to suitable deflection circuits 23 which in turn impresses field-frequency scanning signals on a field-frequency deflection coil 24 associated with image-reproducing device 16.

The receiver of Figure 1 is entirely conventional in all respects with the exception of control stage 22. Synchronizing-signal separator 19 may comprise a simple clipper stage for deriving the composite synchronizing signal from the detected composite video signals, or more complex circuits for performing this function may be employed. Line-frequency deflection circuits 20 preferably include an automatic frequency control system of conventional construction, while field-frequency deflection circuits 23 may comprise a simple discharge tube followed by a power output stage. Other modifications and refinements of the receiver in accordance with known practice may be provided if desired; for example, a gated automatic gain control system has been found quite desirable in present day commercial television receivers.

Control stage 22 comprises a passive oscillatory circuit 25 coupled to an output winding 26 connected in the output circuit of synchronizing-signal separator 19. Oscillatory circuit 25 is connected in series with a unilaterally conducting device, such as a diode 27 or other rectifier, and a load circuit for device 27 comprising the parallel combination of a resistor 28 and a condenser 29. Wave-shaping elements, comprising a condenser 30 connected in series with a resistor 31, are connected in parallel with load circuit 28, 29, and the control signal developed across the series combination of condenser 30 and resistor 31 is applied to the input circuit of field-frequency deflection system 23.

An understanding of the nature of the composite synchronizing signal developed across winding 26 by synchronizing-signal separator 19 is essential to a comprehension of the operation of the present invention. In accordance with present governmental standards, the composite synchronizing signal during alternate fields is substantially as represented in curve A of Figure 2. The composite synchronizing signal comprises line-synchronizing pulses, equalizing pulses recurring at twice the repetition frequency of the line-synchronizing pulses, and field-synchronizing pulses serrated at the repetition frequency of the equalizing pulses. The line-synchronizing pulses are of relatively small duration and recur at the line-scanning frequency. The field-synchronizing pulses are of much longer duration, presently established at three complete line-scanning intervals, and recur at the field-scanning frequency. Under present standards, double interlace scanning is employed; in other words, each image field is composed of alternate lines, and successive fields are interlaced to produce a complete image frame. To insure proper interlace of successive fields, equalizing pulses recurring at twice the repetition frequency of the line-synchronizing pulses precede and follow the field-synchronizing pulses for intervals of three line scansions, and the field-synchronizing pulses are serrated at the repetition frequency of the equalizing pulses. During intermediate fields, the time relation between the line-synchronizing pulses and the field-synchronizing pulses is shifted by one-half a line-scanning interval to insure proper registration of the interlaced image fields. Under presently adopted broadcasting standards, the line-scanning frequency is established at 15,750 cycles per second, the field-scanning frequency at 60 cycles per second, and the equalizing pulse repetition frequency at 31,500 cycles per second.

Figure 2:
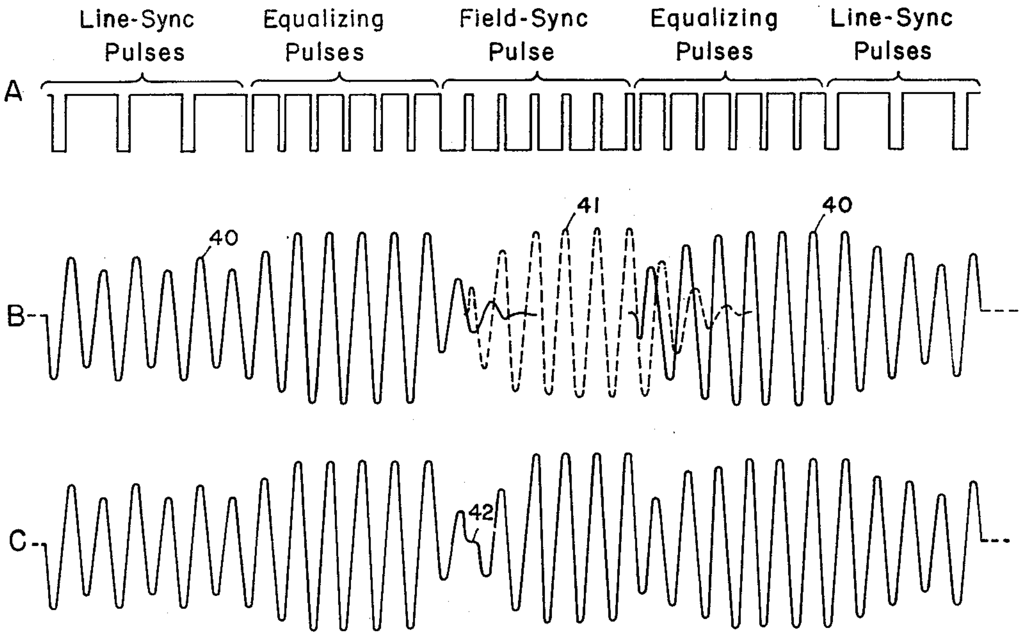
Figure 2 is a graphical representation of certain waveforms which are useful in facilitating an understanding of the invention.

In accordance with the present invention, when a composite synchronizing signal of the double interlace type shown by curve A of Figure 2 is employed, passive oscillatory circuit 25 is tuned substantially to the second harmonic of the repetition frequency of the line-synchronizing pulses, or to the repetition frequency of the equalizing pulses. Under these circumstances, passive oscillatory circuit 25 functions as a filter means substantially selective to the Fourier component of the composite synchronizing signal which corresponds in frequency to the second harmonic of the line-scanning frequency or the fundamental component of the equalizing pulse repetition frequency. When the composite synchronizing signal is impressed on passive oscillatory circuit 25, an oscillatory voltage is produced thereacross in accordance with the energy content of the impressed signal.

The oscillatory voltage produced across ringing circuit 25 or equivalent frequency-selective filter means comprises two components as illustrated in curve B of Figure 2. One component, designated by reference numeral 40, corresponds to the second harmonic component of the line-synchronizing pulses and the fundamental component of the equalizing pulses, these components being substantially in phase with each other and of substantially the same magnitude. However, during the field-synchronizing pulse intervals, the oscillatory voltage produced across circuit 25, designated by reference numeral 41, is substantially 180° out of phase with the voltage 40 produced during the line-synchronizing and equalizing pulse intervals. The resultant composite oscillatory voltage wave produced across ringing circuit 25 is illustrated in somewhat idealized form in curve C of Figure 2 and is characterized by an abrupt change 42, including a substantial phase reversal and consequent decrease in amplitude, at the commencement of each field-synchronizing pulse. In accordance with the invention, this abrupt change is detected to provide a control signal which is employed to drive the field-frequency deflection circuits and effect field-frequency synchronization. Of course, the precise timing of the abrupt change 42 is dependent on the figure of merit or Q of oscillatory circuit 25. The Q of this circuit is not critical but is preferably kept low, at a value of 30 or less, to permit the ringing circuit energy to build up to a maximum before the commencement of the field-synchronizing pulse during both even and odd fields, so that uniformity of the control signal from field to field is insured.

In the embodiment of Figure 1, an amplitude detector comprising diode 27, resistor 28 and condenser 29 is employed to detect the amplitude decrease in the oscillatory voltage developed across ringing circuit 25. The time constant of the detector circuit is selected so that the envelope of the ringing voltage is developed across resistor 28 and condenser 29. The amplitude decrease occurring at the substantial phase reversal 42 occasioned by the serrated field-frequency synchronizing pulse is sharpened by condenser 30 and resistor 31 to form a control pulse which is employed to trigger field-frequency deflection circuits 23. Since extraneous noise has little effect on the amplitude of the oscillatory voltage produced across ringing circuit 25, the field-frequency scanning system is substantially immune to the disrupting influence of such noise impulses.

Figure 3:
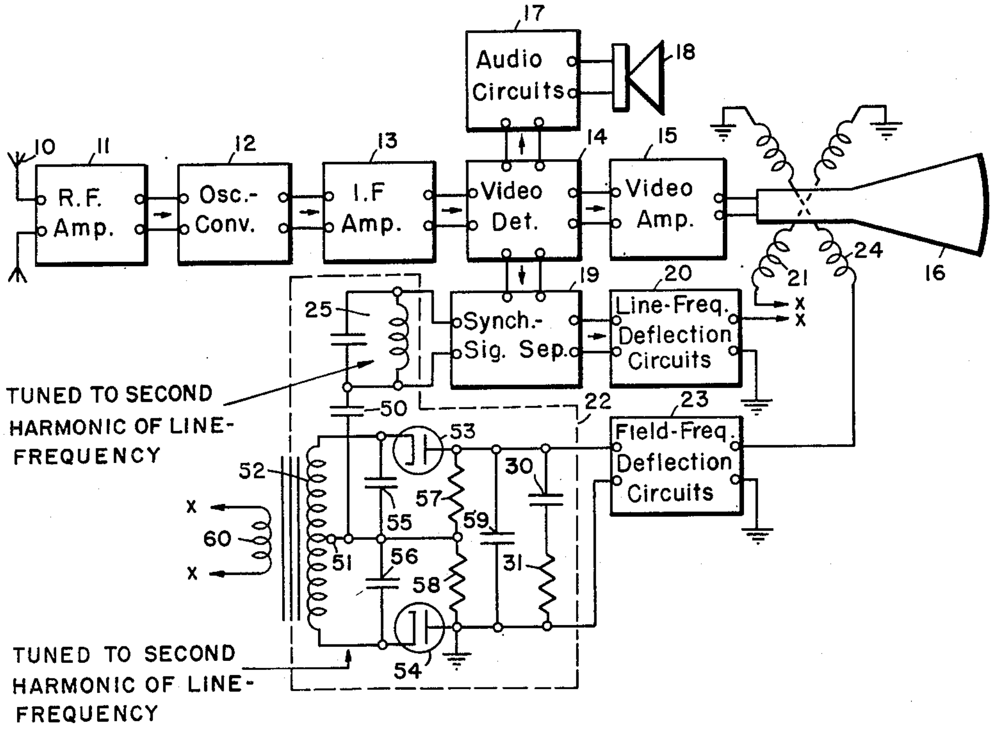
Figure 3 is a schematic diagram of another embodiment of the invention.

In the embodiment of Figure 3, the abrupt change in the oscillatory voltage is detected by means of a phase detector which is responsive to the substantial phase reversal occuring at the commencement of each field-synchronizing pulse to develop the control signal for effecting field-frequency synchronization. The receiver of Figure 3 is substantially identical with that illustrated in Figure 1 with the exception of the construction and operation of the control stage 22. The composite synchronizing signal from synchronizing-signal separator 19 is impressed on a passive oscillatory circuit 25. This oscillatory circuit is coupled by means of a condenser 50 to the center tap 51 of an inductor 52, opposite terminals of which are connected to a pair of balanced diodes 53 and 54 or other unilaterally conducting devices. Condensers 55 and 56 are connected in parallel with the respective halves of winding 52, and a suitable load circuit comprising balanced resistors 57 and 58 and condenser 59 is provided for diodes 53 and 54.

The tuned circuit comprising winding 52 and condensers 55 and 56 and passive oscillatory circuit 25 are each tuned substantially to the second harmonic of the line-scanning frequency. A comparison signal, which may be derived from a winding 60 connected in series with the line-frequency deflection yoke 21, is impressed across winding 52. In operation, control stage 22 functions as a balanced phase detector for comparing the oscillatory voltage developed across ringing circuit 25 with the second harmonic component of the line-frequency scanning signal impressed on deflection coil 21. Owing to the substantial phase reversal in the oscillatory voltage across circuit 25 at the commencement of each field-synchronizing pulse, a control pulse signal is developed across condenser 30 and resistor 31 and is utilized as in the embodiment of Figure 1 to control the field-frequency synchronization. It is apparent that the precise nature of the phase detector employed is not of the essence of the present invention; for example, it is quite possible to employ an unbalanced phase detector for this purpose.

Since the control signal for effecting field-frequency synchronization is derived in the embodiment of Figure 3 by detecting the substantial phase reversal in the oscillatory voltage developed across circuit 25, and since the phase characteristics of this oscillatory voltage are even less sensitive to extraneous noise than the amplitude characteristics, the embodiment of Figure 3 provides even greater noise immunity than that shown and described in connection with Figure 1. Although the embodiment of Figure 3 employs a phase detector, it should be stressed that the system functions in an entirely different manner than conventional automatic frequency control arrangements. In such arrangements, as adapted to field-frequency synchronization, the field-frequency synchronizing pulses are compared in phase with a field-frequency comparison signal developed in the local scanning system, while in the apparatus of the present invention, an oscillatory voltage corresponding to the equalizing pulse frequency components of the composite synchronizing signal is compared in phase with a comparison signal of equal nominal frequency derived from the line-scanning system.

While the invention has been particularly described in connection with the reception of composite television signals of the double interlace type, in view of the fact that presently enforced standards require this type of transmission, it is apparent that the same principles may be employed in connection with either non-interlaced transmission or triple or other multiple interlace transmission. Although a system not employing interlace scanning does not require the transmission of equalizing pulses, the field-frequency synchronizing pulses must still be serrated to avoid disruption of the line-scanning synchronization. In such a system, the passive oscillatory circuit would be tuned substantially to the line-scanning frequency, and the same characteristic abrupt change in phase and amplitude would be encountered at the commencement of each field-synchronizing pulse. In a triple interlace scanning system, the equalizing pulse repetition frequency would be three times the line-scanning frequency, and the passive oscillatory circuit would be tuned substantially to the equalizing pulse repetition frequency. Consequently, in a broad sense, it is apparent that the present invention is useful in the reception of composite television signals including video-signal components and a composite synchronizing signal comprising line-synchronizing pulses and field-synchronizing pulses serrated at an integral multiple (including unity) of the repetition frequency of the line-synchronizing pulses, regardless of whether or not equalizing pulses are present. In any case, the passive oscillatory circuit or other filter means is tuned substantially to the repetition frequency of the serrations of the field-synchronizing pulses.

Thus the present invention provides a new and improved synchronizing system for use in a television receiver or the like. The system is simple and economical and provides substantial immunity to extraneous impulse noise, even in the field-frequency scanning system, without the use of more expensive automatic frequency control arrangements.

While particular embodiments of the present invention have been shown and described, it is apparent that various changes and modifications may be made, and it is therefore contemplated in the appended claim to cover all such changes and modifications as fall within the true spirit and scope of the invention.

I claim:

In a television receiver for utilizing composite video signals of the double interlace type including video-signal components and a composite synchronizing signal including line-synchronizing pulses, equalizing pulses recurring at twice the repetition frequency of said line-synchronizing pulses, and field-synchronizing pulses serrated at the repetition frequency of said equalizing pulses: an image-reproducing device; means for separating said composite synchronizing signal from said video-signal components; line-frequency deflection circuits coupled to said separating means and responsive to said line-synchronizing pulses for controlling the line-frequency scansion of said image-reproducing device; a passive oscillatory circuit tuned to substantially the second harmonic of the repetition frequency of said line synchronizing pulses; means coupling said separating means to said passive oscillatory circuit for impressing said composite synchronizing signal thereon to produce an oscillatory voltage characterized by an abrupt change, including a substantial phase reversal and consequent decrease in amplitude, at the commencement of each field-synchronizing pulse; a balanced phase detector coupled to said passive oscillatory circuit and to said line-frequency deflection circuits for developing a control signal in response to said substantial phase reversal of said oscillatory voltage; and means for utilizing said control signal to control the field-frequency scansion of said image-reproducing device.

References Cited in the file of this patent

UNITED STATES PATENTS

| | | |
|---|---|---|
| Re. 22,390 | Lewis | Nov. 9, 1943 |
| 2,298,864 | Bartelink | Oct. 13, 1942 |
| 2,332,681 | Wendt | Oct. 26, 1943 |
| 2,601,415 | Oliver | June 24, 1952 |
| 2,615,978 | Schlesinger | Oct. 28, 1952 |

FOREIGN PATENTS

| | | |
|---|---|---|
| 731,663 | Germany | Jan. 14, 1943 |